United States Patent [19]

Tai

[11] Patent Number: 5,575,442
[45] Date of Patent: Nov. 19, 1996

[54] GUIDED WING FOR AIRCRAFT FLYING AT HIGH ANGLES OF ATTACK

[75] Inventor: Tsze C. Tai, Potomac, Md.

[73] Assignee: The United States of America as represented by the Secretary of the Navy, Washington, D.C.

[21] Appl. No.: 375,031

[22] Filed: Jan. 19, 1995

[51] Int. Cl.$^6$ ....................................................... B64C 3/58
[52] U.S. Cl. ........................................ 244/198; 244/200
[58] Field of Search ................................. 244/198, 199, 244/200, 130, 87

[56] References Cited

U.S. PATENT DOCUMENTS

| | | | |
|---|---|---|---|
| 1,303,544 | 5/1919 | Dorr | 244/200 |
| 2,074,201 | 3/1937 | Bechereau | 244/35 |
| 3,578,264 | 5/1971 | Kuethe | 244/200 |
| 4,699,340 | 10/1987 | Rethorst | 244/200 |
| 4,830,315 | 5/1989 | Presz, Jr. et al. | 244/200 |

FOREIGN PATENT DOCUMENTS

| | | | |
|---|---|---|---|
| 845900 | 7/1949 | Germany | 244/200 |
| WO93/19981 | 10/1993 | WIPO . | |

OTHER PUBLICATIONS

Tai, Tsze C., "Simulation and Analyis of V-22 Tiltrotor Aircraft Forward Flight FlowField", American Institute of Aeronautics and Astronautics Paper AIAA 95-0045 (Jan. 1995), pp. 1-11.

Primary Examiner—Galen L. Barefoot
Attorney, Agent, or Firm—Gary G. Borda

[57] ABSTRACT

The invention is directed to an apparatus for attaching to a wing operating in a fluid medium for increasing the angle of attack at which the wing experiences aerodynamic/hydrodynamic stall. The wing includes upper and lower surfaces extending between a leading edge and a trailing edge and having a maximum thickness therebetween, and between a root and a tip, wherein the leading and trailing edges define a chord and the root and tip define a span. The apparatus comprises at least one substantially triangular shaped plate member projecting normal to the upper surface of the wing. The at least one plate member has a straight top surface and a curvilinear bottom surface which corresponds to the contour of the upper surface of the wing. The top and bottom surfaces define the height of the at least one plate member and extend in a substantially chordwise direction between an anterior end and a posterior end of the at least one plate member. The at least one plate member has its minimum height at the anterior end and its maximum height at the posterior end wherein the maximum height corresponds to a fully attached boundary layer thickness of a fluid flowing over the upper face, the boundary layer thickness determined at the trailing edge at a predetermined operating condition.

19 Claims, 4 Drawing Sheets

GUIDED WING FOR AIRCRAFT FLYING AT HIGH ANGLES OF ATTACK

STATEMENT OF GOVERNMENT RIGHTS

The invention described herein may be manufactured and used by or for the Government of the United States of America for governmental purposes without the payment of any royalties thereon or therefor.

BACKGROUND OF THE INVENTION

1. Field of Invention

The present invention relates generally to reducing the tendency toward aerodynamic stall experienced by aircraft flying at high angles of attack and, more particularly, to placing chordwise extending guides on wings, hydrofoils and control surfaces to suppress vortex-type three-dimensional flow separation over the surface.

2. Brief Description of Related Art

Lifting surfaces such as wings, hydrofoils and control surfaces (hereinafter referred to generally as wings) used on airplanes, missiles and marine vehicles are ordinarily streamlined bodies having smooth surface contours in both the chordwise (leading edge to trailing edge) and spanwise (root to tip) directions. In the chordwise direction, the shape of the wing, as defined by a particular wing section (cross-sectional profile in a plane normal to the wing span), is generally a known airfoil shape. For example, section profiles may be selected from sections of the National Advisory Committee for Aeronautics (NACA) such as NACA 4-digit profiles (e.g., NACA 0020), from NASA LS/MS airfoil series for general aviation, or from alternative section profiles such as TMB-EPH (elliptic-parabolic-hyperbolic) sections for hydrodynamic applications. Thus, the generally streamlined, curvilinear shape of the wing surface is defined by a series of chordwise cross-sections separated in the spanwise direction.

Flow over a wing operating in a fluid medium generates a pressure differential between the upper and lower surfaces of the wing resulting in a lift force. The lift force produced varies with the wing's angle of attack (angle of wing chord relative to the incoming undisturbed free stream flow) and the incoming flow velocity (velocity of wing relative to the undisturbed free stream flow into the wing). Concurrently, a drag force is produced that must be overcome by a thrust force provided by the engine. Streamlined shapes, such as described above, produce favorable aerodynamic or hydrodynamic characteristics at the design point (design angle of attack and design speed). However, those characteristics are degraded significantly at off-design conditions. As the flow accelerates and/or as the angle of attack of the wing increases, flow separation becomes a problem resulting in increased drag and loss of lift.

Based on the fluid dynamics theory of three-dimensional flow separation, two basic types of flow separation in three-dimensions have been identified: bubble-type separation and vortex-type separation. Both types of separation are caused by pressure gradients produced by flow acceleration over the wing surface; however, each type of separation results from entirely different flow mechanisms. Bubble-type separation results when local pressure gradients cause skin friction to diminish. In the case of vortex-type separation, crossflow pressure gradients drive the streamlines in the rear region of the wing to converge in the spanwise direction thus producing a crossflow component of the flow.

During normal operations the wing experiences small to moderate angles of attack. At small angles of attack the streamlines near the body follow the wing surface closely, right to the trailing edge. As the angle of attack increases, changes in flow pattern occur, primarily on the upper surface of the wing. At a certain value of the angle of attack, separation begins at the rear of the wing on the upper side and moves forward as angle of attack increases. Typically, for example, for a particular aircraft design a maximum prestall angle of attack is identified above which the pilot should not operate. Below this angle of attack the lift and drag vary within a known performance envelope. Flow over the wing is predominately chordwise with little or no crossflow or separation. However, there exist circumstances where a vehicle must operate at high angles of attack. For instance, an aircraft undergoing unusual flight maneuvers or engaging in a short take-off and a marine vehicle encountering a sharp turn both experience high angles of attack over wings and control surfaces. As the angle of attack of the wing begins to increase, both lift and drag increase, requiring increased engine power output to overcome the drag. As angle of attack increases further, the flow streamlines in the rear regions of the wing converge in a spanwise direction resulting in vortex-type three-dimensional flow separation and eventually in wing stall, i.e., massive flow separation wherein lift decreases sharply while drag increases sharply. The resulting loss of lift and control produces a highly unstable and dangerous situation. Such flow separation problems have been a major obstacle in the field of aero-hydrodynamics and have spawned extensive research efforts over the past four decades. Consequently, there is a need for a means to increase the operational envelope of known wings, more specifically, a means to increase the angles of attack at which the wing can operate without stalling.

OBJECTS OF THE INVENTION

Accordingly, it is an object of the present invention to provide a means whereby a wing can function at increased angles of attack, compared to prior art wings, without experiencing stall.

It is a further object of the present invention to provide a means for suppressing vortex-type three-dimensional flow separation over a wing.

It is a further object of the present invention to provide a means for guiding flow over a wing in a chordwise direction and for minimizing spanwise flow.

It is still a further object of the present invention to provide a wing that is capable of operating at increased angles of attack without experiencing aerodynamic stall.

Other objects and advantages of the present invention will become apparent to those skilled in the art upon a reading of the following detailed description taken in conjunction with the drawings and the claims supported thereby.

SUMMARY OF THE INVENTION

By suppressing vortex-type three-dimensional flow separation over a wing, aerodynamic/hydrodynamic performance of the wing can be significantly improved. As a result, an aircraft or missile can fly at higher angles of attack, as compared to aircraft having conventional wings that experiencing flow separation, without risking aerodynamic stall. By suppressing flow separation on control surfaces of marine vehicles, drag is reduced and maneuvering force is maintained at higher control surface angles.

In accordance with the present invention, the objects are met by an apparatus for attaching to a wing operating in a fluid medium for increasing the angle of attack at which the wing experiences aerodynamic/hydrodynamic stall. The wing includes upper and lower surfaces extending between a leading edge and a trailing edge and having a maximum thickness therebetween, and between a root and a tip, wherein the leading and trailing edges define a chord and the root and tip define a span. The apparatus comprises at least one substantially triangular shaped plate member projecting normal to the upper surface of the wing. The at least one plate member has a straight top surface and a curvilinear bottom surface. The shape of the curvilinear bottom surface corresponds to the contour of the upper surface of the wing. The curvilinear bottom surface of the at least one plate member adjoins and is rigidly attached to the upper surface of the wing. The top and bottom surfaces define the height of the at least one plate member and extend in a substantially chordwise direction between an anterior end and a posterior end of the at least one plate member. The at least one plate member has its minimum height at the anterior end and its maximum height at the posterior end.

In accordance with another aspect of the present invention, the objects are met by an improved guided wing comprising an upper surface and a lower surface and at least one wing guide fixedly attached to the upper surface and projecting normal to the upper surface. The upper and lower surfaces extend between a leading edge and a trailing edge each formed by an intersection of the upper and lower surfaces, and between a root and a tip, wherein the leading and trailing edges define a chord and the root and tip define a span. The upper and lower surfaces further define a plurality of streamlined cross-sectional profiles separated in a spanwise direction between the root and the tip. Each profile extends between the leading and trailing edges and has a maximum thickness therebetween. Each of the at least one wing guides comprises a substantially chordwise extending, generally triangular shaped plate member. Each plate member has a straight top surface and a curvilinear bottom surface. The bottom surface of the plate member corresponds to the contours of the upper surface of the wing and is attached thereto. The top and bottom surfaces extend in the substantially chordwise direction between an anterior end and a posterior end of the plate member and define the height of the plate member. The plate member has its minimum height at the anterior end and its maximum height at the posterior end.

In accordance with a further aspect of the present invention, the objects are met by a system for increasing the angle of attack at which a lifting surface stalls, comprising a lifting surface including an upper face and a lower face and at least one flow guide fixedly attached to the upper face and projecting normal to the upper face. The upper and lower faces of the lifting surface extend between a root and a tip which define the span. The upper and lower faces further define a plurality of cross-sectional profiles separated in the spanwise direction between the root and the tip. Each profile extends between a leading edge and a trailing edge, which define the chord, and has a point or region of maximum thickness therebetween. Each of the at least one flow guides comprises a substantially chordwise extending, generally triangular shaped plate member residing in a plane substantially aligned with one of the plurality of cross-sectional profiles. The plate member has a maximum spanwise width of less than about one percent of the length of the chord of the corresponding profile. The plate member has a straight top edge and a curvilinear bottom edge, the bottom edge corresponding to and adjoining the upper face of the lifting surface. The top and bottom edges define the height of the plate member and extend in the substantially chordwise direction between the anterior end and the posterior end of the plate member. The plate member has a minimum height at the anterior end and a maximum height at the posterior end wherein the maximum height substantially corresponds to a fully attached boundary layer thickness of a fluid flowing over the upper face, the boundary layer thickness being determined at the trailing edge at a predetermined operating condition.

The present invention acts to induces the fluid flow over the upper face to remain predominantly chordwise and thus suppresses vortex-type three-dimensional flow separation over the wing or lifting surface.

BRIEF DESCRIPTION OF THE DRAWINGS

The foregoing objects and other advantages of the present invention will be more fully understood by reference to the following description taken in conjunction with the accompanying drawings wherein like reference numerals refer to like or corresponding element throughout and wherein.

DETAILED DESCRIPTION OF THE PREFERRED EMBODIMENT

Figure 1:
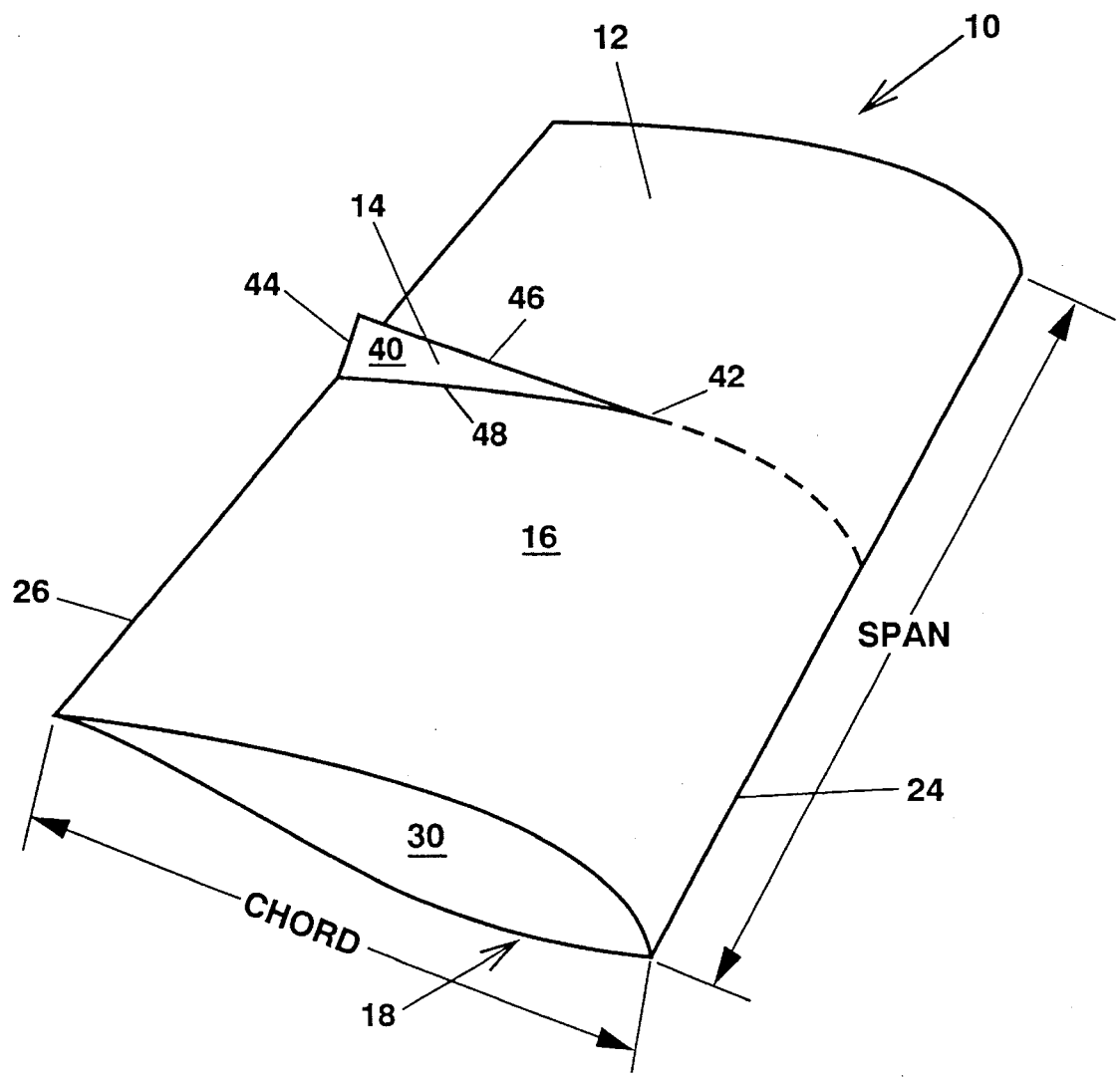
FIG. 1 is a perspective view of one embodiment of the present invention.
Figure 2:
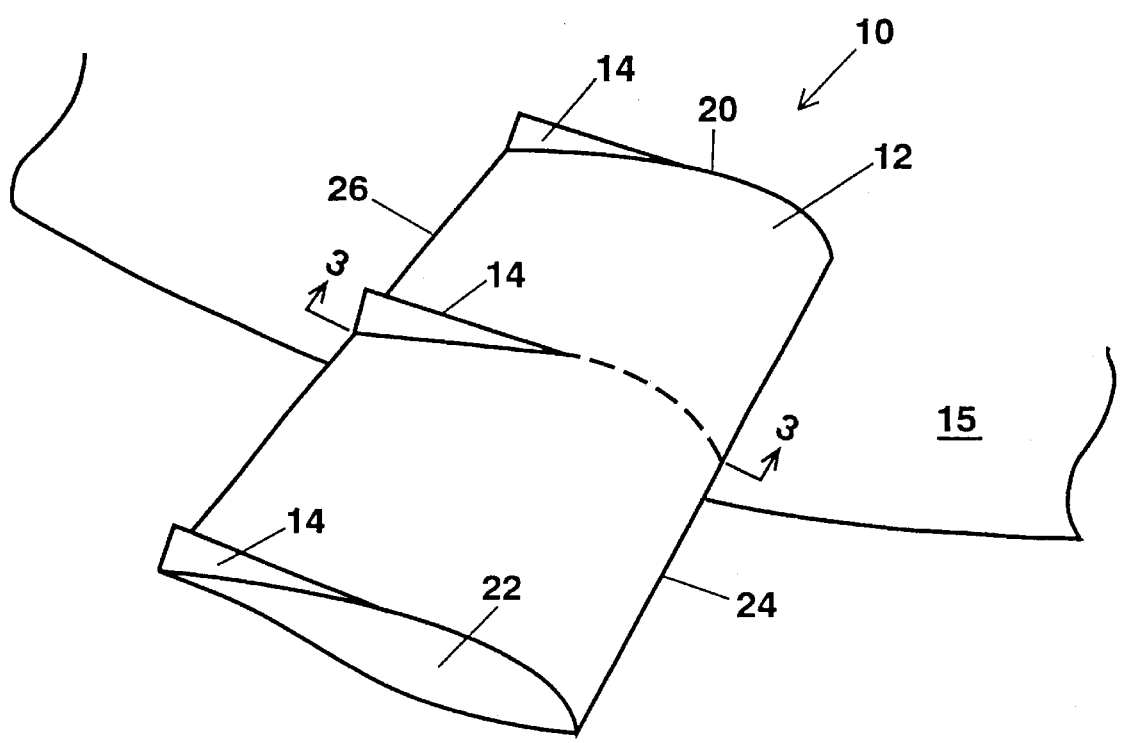
FIG. 2 is a perspective view of an alternative embodiment of the present invention.
Figure 3:
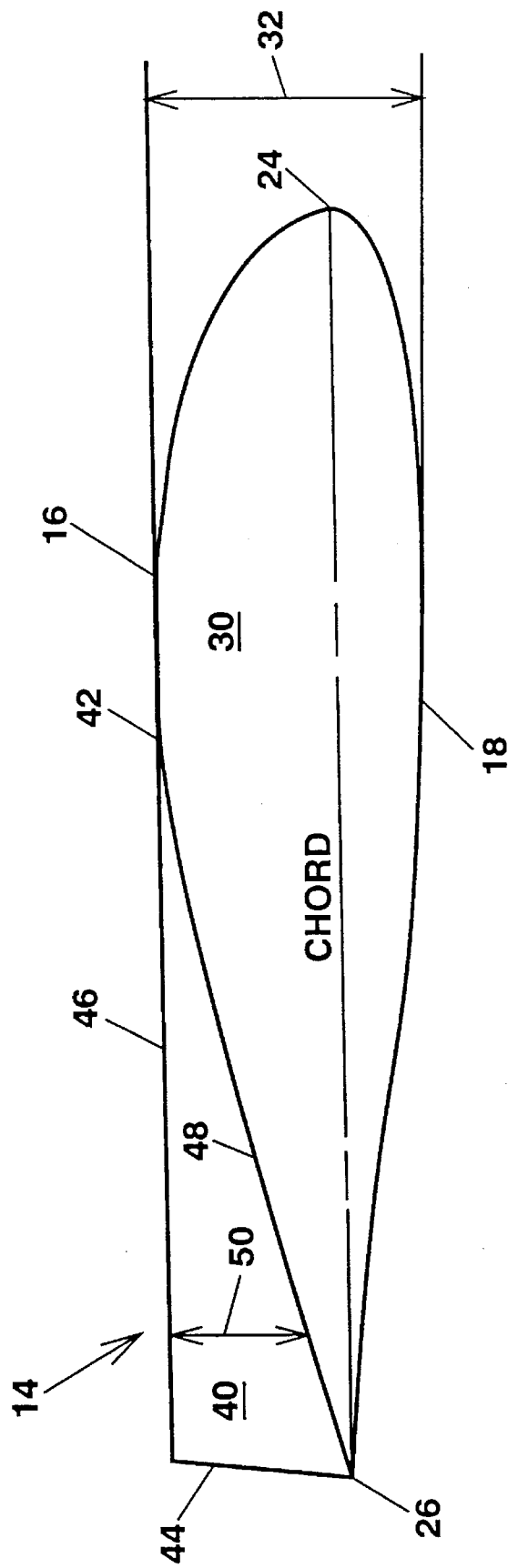
FIG. 3 is a cross-sectional view of the present invention along line 3—3 of FIG. 2.

Referring now to the drawings, and particularly to FIGS. 1–3, guided wing 10 of the present invention is shown. Guided wing 10 comprises wing or lifting surface 12 and one or more wing guides 14 rigidly attached to wing 12 in any appropriate known manner such as welding, bonding, bolting or the like. Herein, in the specification and claims, wing 12, when referring to the present invention, is defined as half of a conventionally defined wing having a tip-to-tip span b, a chord c, a plan area S, and an aspect ratio=$b^2/S$. Thus, wing 12 is measured from one tip of a conventionally defined wing (tip 22 of wing 12) to the mid-span of a conventionally defined wing (root 20 of wing 12). As shown in FIG. 2, wing 12 is attached to body 15 at root 20. Body 15 may be any body that requires a lifting surface to provide lift or directional control such as an airplane fuselage, a missile, or a marine vehicle hull. Thus, guided wing 10 may be used either as a wing or as a control surface such as a rudder or canard. Guided wing 10 is anticipated for use on subsonic aircraft operating at or below transonic speeds, and preferably on military-type aircraft that employ high angle of attack maneuvers and/or short, high angle take-offs. Wing 12 may take any of the various configurations used for hydrodynamic or aerodynamic applications. For example, wing 12 may be a tapered wing (chordlength varies along the span from root to tip) or a rectangular wing (constant chordlength from root to tip). Additionally, with respect to body 15, wing 12 may be a straight wing, a forward or aft swept wing, and/or a dihedral wing; however, the orientation relative to body 15 is not a limitation on the present invention. Wing 12 and wing guide 14 may be made of known materials for constructing wings and control surfaces, for example, metals, metal composites, and non-metal composite materials such as fiber reinforced plastics or organic matrix composites.

Wing 12 includes upper surface 16, lower surface 18, root 20 and tip 22. Wing 10 further includes leading edge 24 and trailing edge 26 formed by the upstream and downstream intersections, respectively, of upper and lower surfaces 16 and 18. Herein, in the specification and claims, the span of wing 12, when referring to the present invention, is defined as the straight line distance between root 20 and tip 22. Thus, the span of wing 12 is equal to half the span of a conventionally defined wing. The straight line distance between leading edge 24 and trailing edge 26 defines the wing chord. Herein, the plane of the wing is defined as the plane passing through leading edge 24 and trailing edge 26. The orientation of the wing with respect to the undisturbed free stream is known as the angle of attack. The angle of attack $\alpha$ of wing 12 is the angle between the plane of the wing and the free stream velocity vector, i.e., the direction of the undisturbed free stream.

The streamlined shape of wing 12 is defined by a plurality of streamlined cross-sectional profiles 30 spaced in the spanwise direction between root 20 and tip 22. Each profile 30 extends in the chordwise direction between leading edge 24 and trailing edge 26 and has a point or region of maximum thickness 32 therebetween. Generally, the maximum thickness of wing 12, which corresponds to point or region of maximum thickness 32 of profiles 30, will be located in the fore or mid region of wing 12. Profiles 30 are cross-sectional cuts perpendicular to the wing span and, thus, reside in parallel planes that are perpendicular to the wing span and to the plane of the wing. The shape of wing 12 as defined by profiles 30 may be symmetric or non-symmetric. The mean chordline of each of profiles 30 is the line between leading edge 24 and trailing edge 26 which is equidistant between upper surface 16 and lower surface 18. If wing 12 is symmetric, i.e., profiles 30 are symmetric about their mean chordlines, each mean chordline will be a straight line corresponding to the wing chord, and the plane passing through the mean chordlines of profiles 30 will coincide with the plane of the wing. The local angle of attack at any particular profile 30 is the angle between the particular profile chord (straight line connecting leading edge 24 and trailing edge 26 of that profile) and the direction of the free stream flow into wing 12 at that particular profile 30.

One or more wing guides 14 is rigidly attached to upper surface 16 of wing 12. FIG. 1 shows a single wing guide 14 located approximately at the mid-span station of wing 12, i.e., located substantially equidistantly between root 20 and tip 22. FIG. 2 shows three wing guides, one located adjacent tip 22, one located adjacent root 20, and one located substantially equidistantly between root 20 and tip 22.

Each wing guide 14 is a generally triangular shaped plate member 40 that extends in a substantially chordwise direction between anterior end 42, located at the fore region of wing 12, and posterior end 44, located at or near trailing edge 26. Additionally, each wing guide 14 is mounted on wing 12 such that it projects normal to upper surface 16. Accordingly, each plate member 40 resides in a plane that is both normal to upper surface 16 and is substantially aligned with one of the plurality of cross-sectional profiles 30 of wing 12. Plate member 40 has a straight top edge or surface 46 and a curvilinear bottom edge or surface 48. Bottom surface 48 of plate member 40 is attached to upper surface 16 of wing 12 and, thus, has a shape corresponding to the contour of upper surface 16 upon which it is mounted. Preferably, anterior end 42 of wing guide 16 is located adjacent the point or region of maximum thickness of wing 12 (maximum thickness 32 of cross-sectional profiles 30) and posterior end 44 is located adjacent trailing edge 26. At anterior end 42, plate member 40 is preferably faired into upper surface 16 of wing 12. Additionally, either or both of posterior end 44 and top surface 46 of plate member 40 may be flat, rounded, or tapered.

In order to provide a small frontal area to the flow and, consequently, minimize added drag resulting from wing guide 14, plate member 40 should be thin, i.e., transverse (spanwise) dimension should be small relative to longitudinal (chordwise) dimension. The maximum transverse width of plate member 40 is preferably less than or equal to about one percent of the longitudinal length (chordlength) of wing 12. However, if structural considerations require it, the width of plate member 40 may be greater than one percent of the chordlength of wing 12 but in no case should the maximum transverse dimension of plate member 40 be greater than about four percent of the maximum longitudinal dimension of plate member 40. For simplicity, plate member 40 may be a flat plate. However, this is not required, e.g., plate member 40 may have a tapered profile from bottom surface 48 to top surface 46 with the maximum transverse width at the base region adjacent bottom surface 48.

The distance between top surface 46 and bottom surface 48 defines height 50 of plate member 40. Plate member 40 has a minimum height at anterior end 42 and a maximum height at or proximate to posterior end 44. The maximum height of plate member 40 generally corresponds to the boundary layer thickness of a fully attached fluid flowing over upper face 16, wherein the boundary layer thickness is determined at trailing edge 26 at a predetermined operating condition. The predetermined operating condition at which the boundary thickness is determined is preferably the design condition for the vehicle. Alternatively, the predetermined operating condition can correspond to the maximum pre-stall angle of attack. The maximum pre-stall angle of attack is dependent upon the sweep angle of the wing, the thickness of the wing, and the operating speed of the vehicle. Maximum pre-stall angle of attack may be determined by experimental or computational methods that are well known in the art. Preferably, to minimize added surface area while maximizing the effect on the viscous boundary layer flow, the maximum height of plate member 40 should just exceed the boundary layer thickness determined at trailing edge 26. Consequently, the preferred maximum height of plate member 40 is between about 100% and about 110% of the boundary layer thickness determined at trailing edge 26 of wing 12 at the predetermined operating condition. For simplicity, posterior end 44, which extends from top surface 46 to bottom surface 48, may be perpendicular to the wing chord, however, this is not required. Moreover, the included angle between top surface 46 and posterior end 44 is not a limitation on the present invention and may be more, less, or equal to 90°.

By the boundary layer is meant the region of fluid close to the body where, owing to viscosity, the normal gradients of velocity are large as compared with longitudinal variations, and thus, the shear stress is significant. In the boundary layer the velocity of the fluid u increases from zero at the surface of the body to its maximum value U, which corresponds to the velocity of the inviscid stream, i.e., the local external velocity relative to the body. The boundary layer thickness δ is the distance above and normal to the surface of the body to the point at which the speed attains its equivalent external flow velocity relative to the body. That speed is conventionally determined by the equation u=0.99 U which means that the boundary layer thickness is determined at the point where the local flow speed u is 99 percent of the local external velocity U of the inviscid fluid relative to the body. The boundary layer thickness varies along the body, being zero at the leading edge and increasing downstream of the leading edge. Empirical expressions for the boundary layer thickness are well known in the art, e.g., Blasius' formulation for laminar flow $\delta(x)=5.2x/(R_x)^{1/2}$ and Von Karmans' formulation for turbulent flow $\delta(x)=0.37x/(R_x)^{1/5}$, where x is the distance measured downstream from the leading edge, and $R_x$ is the Reynolds number at x ($R_x=Ux/\nu$, where $\nu$ is the coefficient of kinematic viscosity of the fluid). Other methods of determining the boundary layer thickness have been developed using viscous flow theory and are well known in the art. For example, boundary layer thickness calculations may be performed using computational fluid dynamics (CFD) techniques based on solution of the Navier-Stokes equations. An example of a CFD based determination of the flowfield about a wing-fuselage configuration is presented in Tai, Tsze C., "Simulation and Analysis of V-22 Tiltrotor Aircraft Forward Flight Flowfield," American Institute of Aeronautics and Astronautics Paper AIAA 95-0045 (January 1995), pp. 1–11. Since the determination of boundary layer thickness over a streamlined body is well known in the art it will not be disclosed in detail herein.

Wing guide 14 should be designed such that its height at posterior end 44 exceeds the boundary layer thickness at that point over a known range of operation in terms of angle of attack, the Reynolds and Mach numbers, and the spanwise location of wing guide 14. That is, the boundary layer thickness should be determined for the known performance envelope for normal operation of the wing or control surface at the chordwise location at which wing guide 14 is to be installed. The preferred embodiment of wing guide 14 will then be designed such that: 1) the shape of bottom surface 48 of wing guide 14 corresponds to the shape of upper surface 16 of wing 12 at profile 30 at which wing guide 14 will be installed; 2) the maximum transverse width of wing guide 14 will be less than or equal to one percent of the chordlength of profile 30 at which wing guide 14 will be installed; and 3) the maximum height of wing guide 14 will just exceed the maximum fully attached boundary layer thickness determined at a predetermined operating condition at profile 30 at which wing guide 14 will be installed. The maximum fully attached (non-separated) boundary layer thickness will typically occur at the trailing edge the wing. For high performance aircraft (e.g., fighter aircraft) that may operate at unusually high angles of attack, or commercial aircraft having large aspect ratio wings, where more than one wing guide is preferable, each wing guide should be designed separately for its intended spanwise location. As stated above, modern CFD techniques based on the Navier-Stokes solution provide an appropriate and preferable method for determining boundary layer thickness.

Figure 4:
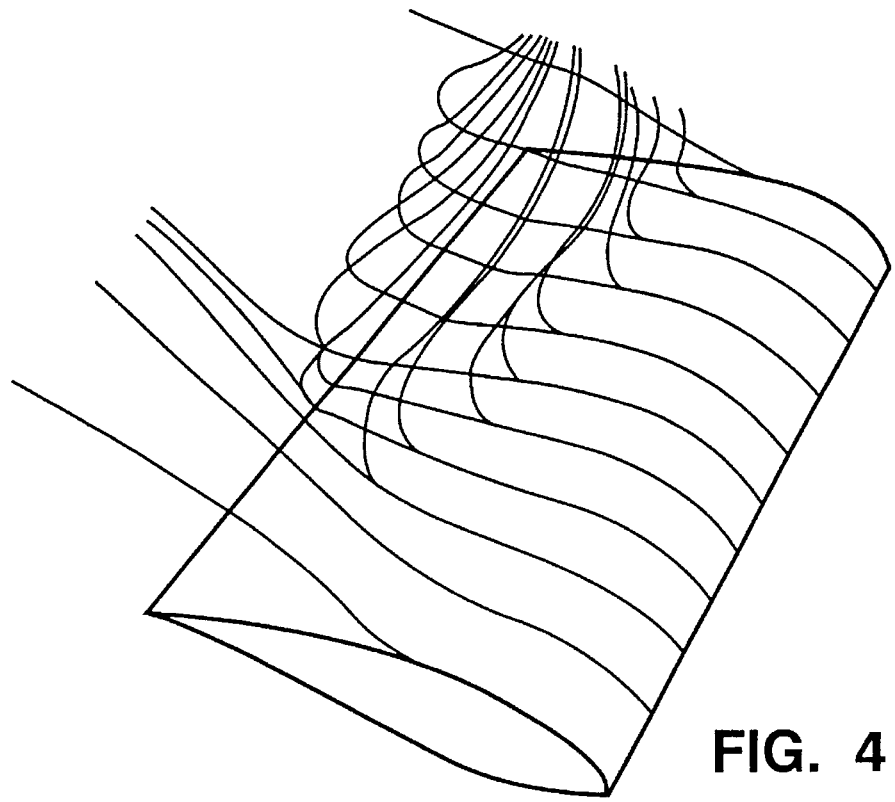
FIG. 4 is a perspective view of half of a conventionally defined wing, without the present invention, operating at Mach No.=0.345, angle of attack=16°, and Reynolds No.= $1.82 \times 10^7$, showing a high level of crossflow in the rear region of the wing.
Figure 5:
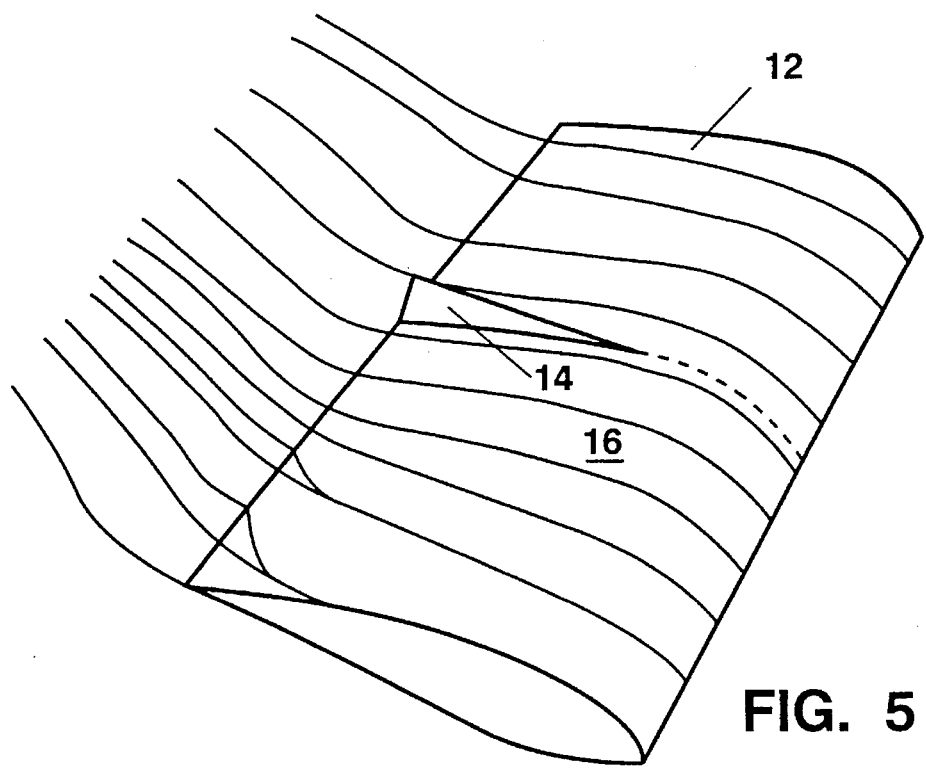
FIG. 5 is a perspective view of a guided wing of the present invention operating at Mach No.=0.345, angle of attack=16°, and Reynolds No.=$1.82 \times 10^7$, showing a very low level of crossflow in the rear region of the wing.

FIGS. 4 and 5 represent particle traces of the streamlines over a wing at Mach No. =0.345, angle of attack=16°, and Reynolds No.=1.82×10⁷, without and with the present invention, respectively. FIG. 4, showing streamlines over a wing without the present invention, depicts a flowfield having a high level of crossflow in the rear region of the wing resulting in massive flow separation over the upper wing surface. FIG. 5, showing streamlines over wing 12 fitted with a single wing guide 14 at approximately the mid-span station, illustrates operation of the present invention in inducing flow to remain in a predominantly chordwise direction. Flowfields depicted in FIGS. 4 and 5 were determined using CFD techniques including finite-volume discretization for solution to the thin-layer Navier-Stokes equations with turbulence models as more fully described in the American Institute of Aeronautics and Astronautics Paper AIAA 95-0045 referred to above.

As shown in FIG. 4, flow in the forward and mid regions of a conventional prior art wing are generally chordwise, however, there is a significant spanwise flow component in the rear region of the wing resulting in a wake of separated flow. If the flow over the wing can be guided to proceed substantially in the chordwise direction over the entire wing surface, the three-dimensional flow is reduced to sectional two-dimensional flow and no vortex-type flow separation is present. As shown in FIG. 5, a single wing guide 14 at the mid-span station of wing 12 induces the flow over upper surface 16 to remain predominantly chordwise thus suppressing vortex-type three-dimensional flow separation over the wing. The single wing guide 14 of FIGS. 1 and 5 guides streamlines inside the boundary layer (viscous streamlines) in the rear regions of upper surface 16 in the chordwise direction rather than the spanwise direction because of the barrier created by wing guide 14. Consequently, convergence of the viscous streamlines, which generally occurs in the spanwise direction in the rear region of the wing (region downstream of the maximum chordwise thickness of the wing), is greatly impeded or substantially delayed. Accordingly, vortex-type three-dimensional flow separation is postponed and the stall angle is incrementally increased over the stall angle of the wing without wing guide 14.

The advantages of the present invention are numerous. The guided wing of the present invention provides enhanced lift-to-drag values and reduced risk of aerodynamic stall to aircraft operating at high angles of attack. The wing guide of the present invention may be added to any conventional wing to provide enhanced performance. Because the shape and size of the wing guide provides a very small frontal area to the flow and minimizes added surface area, the added weight and drag are minimized. The present invention provides simplicity in manufacturing and installation, and reliability in operation. The wing guides are permanently fixed on the wing, have no moving parts, and require no added controls. The present invention is a simple, cost effective solution to a long-standing problem in aero-hydrodynamics.

The present invention and many of its attendant advantages will be understood from the foregoing description and it will be apparent to those skilled in the art to which the invention relates that various modifications may be made in the form, construction and arrangement of the elements of the invention described herein without departing from the spirit and scope of the invention or sacrificing all of its material advantages. The forms of the present invention herein described are not intended to be limiting but are merely preferred or exemplary embodiments thereof.

What is claimed is:

1. An apparatus for attaching to a wing operating in a fluid medium for increasing the angle of attack at which the wing experiences aerodynamic/hydrodynamic stall, the wing including upper and lower surfaces extending between a leading edge and a trailing edge and having a maximum thickness therebetween, and between a root and a tip, wherein the leading and trailing edges define a chord and the root and tip define a span, said apparatus comprising:

at least one plate member projecting normal to the upper surface of the wing, said at least one plate member having a straight top surface and a curvilinear bottom surface, said bottom surface adjoining the upper surface of the wing and having a shape corresponding thereto, said top and bottom surfaces defining a height of said at least one plate member, said top and bottom surfaces extending in a substantially chordwise direction between an anterior end and a posterior end of said at least one plate member, said at least one plate member having a minimum height at said anterior end and a maximum height at said posterior end wherein said maximum height is equal to between about 100% and 110% of a fully attached boundary layer thickness of a fluid flowing over the upper surface of the wing, said boundary layer thickness being determined at said trailing edge at a predetermined operating condition.

2. An apparatus as in claim 1 wherein said at least one plate member has a maximum width of less than about one percent of the length of the wing chord.

3. An apparatus as in claim 1 wherein said anterior end is located adjacent the maximum thickness of the wing and said posterior end is located adjacent the trailing edge of the wing.

4. An apparatus as in claim 1 wherein said at least one plate member is a single plate member located substantially equidistantly between the root and the tip.

5. An apparatus as in claim 1 wherein said at least one plate member comprises three discrete plate members.

6. An apparatus as in claim 5 wherein a first one of said plate members is located adjacent the root, a second one of said plate members is located adjacent the tip, and a third one of said plate members is located substantially equidistantly between said first one and said second one of said plate members.

7. A guided wing, comprising:

an upper surface and a lower surface, said upper and lower surfaces extending between a leading edge and a trailing edge each formed by an intersection of said upper and lower surfaces, and between a root and a tip, wherein said leading and trailing edges define a chord and said root and tip define a span;

said upper and lower surfaces further defining a plurality of streamlined cross-sectional profiles separated in a spanwise direction between said root and said tip, each of said profiles extending between said leading and trailing edges and having a maximum thickness therebetween; and at least one wing guide fixedly attached to said upper surface and projecting normal thereto, each of said at least one wing guides comprising:

a substantially chordwise extending plate member, said plate member having a straight top edge and a curvilinear bottom edge, said bottom edge adjoining said upper surface and having a shape corresponding thereto, said top and bottom edges defining a height of said plate member, said top and bottom edges extending in said substantially chordwise direction between an anterior end and a posterior end of said plate member, said anterior end and said posterior end defining a maximum longitudinal dimension of said at least one plate member, said at least one plate member having a maximum transverse dimension less than about four percent of said maximum longitudinal dimension, and said plate member having a minimum height at said anterior end and a maximum height at said posterior end.

8. A guided wing as in claim 7 wherein said plate member is positioned above and parallel to one of said plurality of cross-sectional profiles, and further wherein said maximum transverse dimension is less than about one percent of said chord of said profile.

9. A guided wing as in claim 7 wherein said plate member is positioned above and parallel to one of said plurality of cross-sectional profiles, and further wherein said anterior end is located adjacent said maximum thickness of said profile and said posterior end is located adjacent said trailing edge of said profile.

10. A guided wing as in claim 7, wherein said at least one wing guide is a single wing guide located substantially equidistantly between said root and said tip.

11. A guided wing as in claim 7 wherein said at least one wing guide comprises three discrete wing guides.

12. A guided wing as in claim 11 wherein a first one of said wing guides is located adjacent said root, a second one of said wing guides is located adjacent said tip, and a third one of said wing guides is located substantially equidistantly between said first one and said second one of said wing guides.

13. A guided wing as in claim 7 wherein said maximum height is equal to between about 100% and about 110% of a fully attached boundary layer thickness of a fluid flowing over said upper surface, said boundary layer thickness being determined at said trailing edge at a predetermined operating condition.

14. A system for increasing the angle of attack at which a lifting surface stalls, comprising:

a lifting surface, said lifting surface including an upper face and a lower face, said upper and lower faces extending between a root and a tip, said root and said tip defining a span, said upper and lower faces further defining a plurality of cross-sectional profiles separated in a spanwise direction between said root and said tip, each of said profiles extending between a leading edge and a trailing edge and having a point of maximum thickness therebetween, said leading and trailing edges defining a chord; and at least one flow guide fixedly attached to said upper face and projecting normal thereto, each of said at least one flow guides comprising:

a substantially chordwise extending plate member, said plate member residing in a plane substantially aligned with one of said plurality of cross-sectional profiles, said plate member having a straight top edge and a curvilinear bottom edge, said bottom edge adjoining said upper face and having a shape corresponding thereto, said top and bottom edges defining a height of said plate member, said top and bottom edges extending in said substantially chordwise direction between an anterior end and a posterior end of said plate member, said anterior end and said posterior end defining a maximum longitudinal dimension of said at least one plate member, said at least one plate member having a maximum transverse dimension less than about four percent of said maximum longitudinal dimension, and said plate member having a minimum height at said anterior end and a maximum height at said posterior end wherein said maximum height substantially corresponds to a fully attached boundary layer thickness of a fluid flowing over said upper face, said boundary layer thickness being determined at said trailing edge at a predetermined operating condition, wherein said at least one flow guide induces the boundary layer flow over said upper face to remain predominantly chordwise to suppresses vortex-type three-dimensional flow separation over said lifting surface.

15. A system as in claim 14 wherein said anterior end is located adjacent said point of maximum thickness and said posterior end is located adjacent said trailing edge.

16. A system as in claim 14 wherein said at least one wing guide is a single wing guide located substantially equidistantly between said root and said tip.

17. An apparatus according to claim 16, further comprising process means for converting the output signal of said output means into a binary signal with an intermediate tone processing.

18. A system as in claim 17 wherein a first one of said wing guides is located adjacent said root, a second one of said wing guides is located adjacent said tip, and a third one of said wing guides is located substantially equidistantly between said first one and said second one of said wing guides.

19. A system as in claim 14 wherein said maximum transverse dimension is less than about one percent of a length of said chord.

* * * * *